Figure 1:
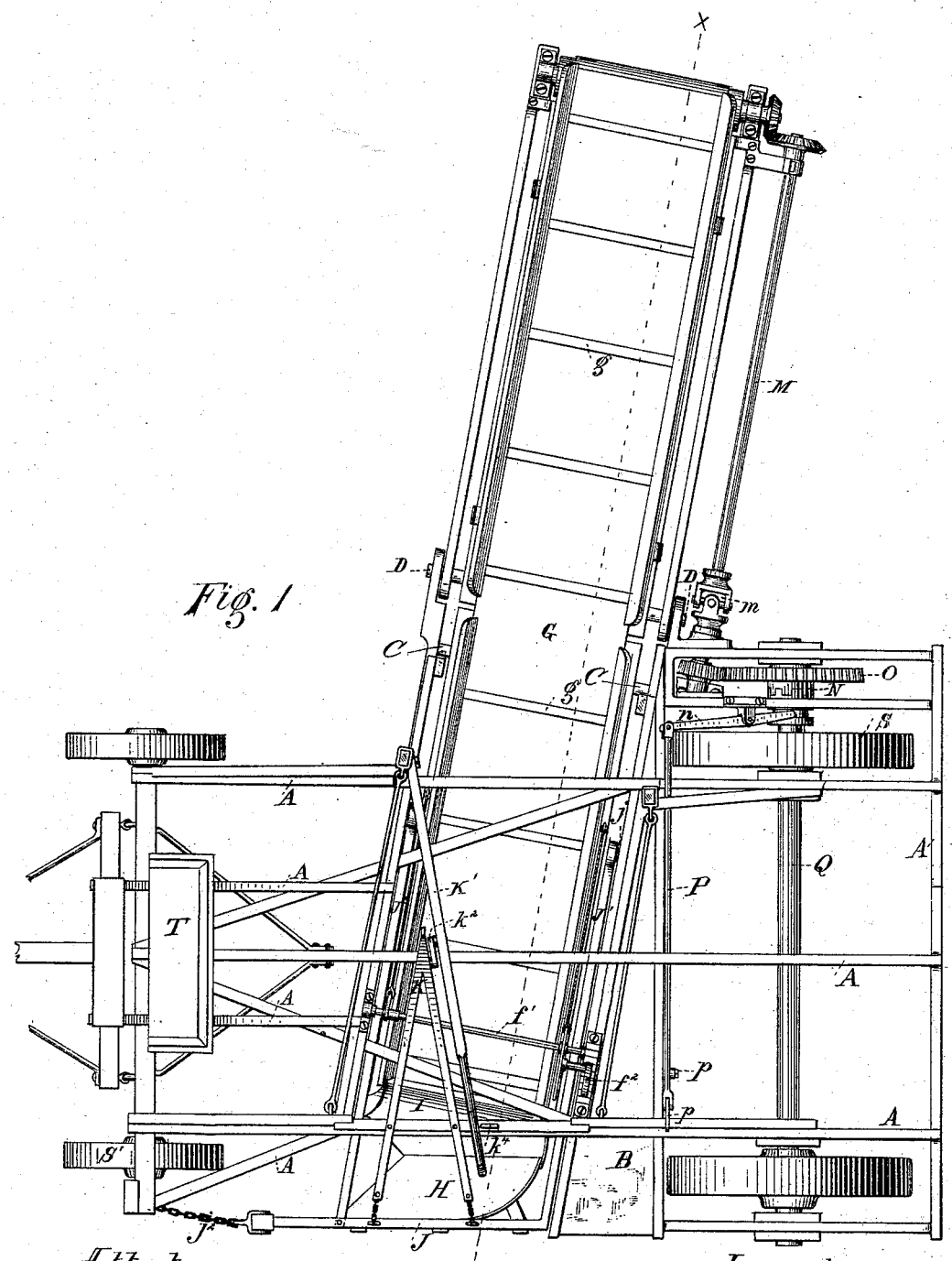

(No Model.)  2 Sheets—Sheet 1.

J. C. PRESCOTT.
GRADING AND DITCHING MACHINE.

No. 257,758. Patented May 9, 1882.

Attest
Chas. F. Gessert
D. S. Oliver.

Inventor
John C. Prescott
By Geo Jillman
his Atty (No Model.) 2 Sheets—Sheet 2.
J. C. PRESCOTT.
GRADING AND DITCHING MACHINE.
No. 257,758. Patented May 9, 1882.
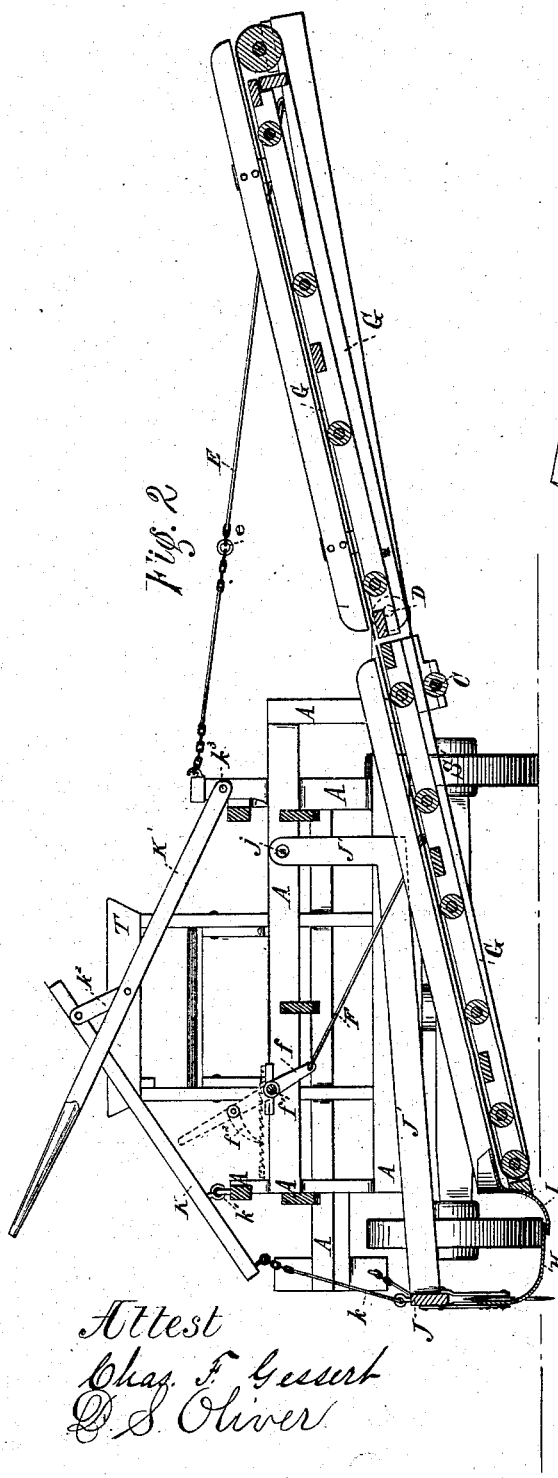
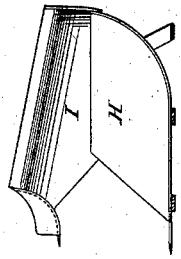
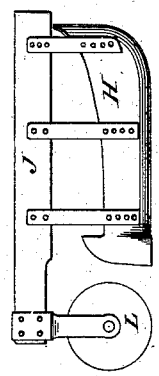
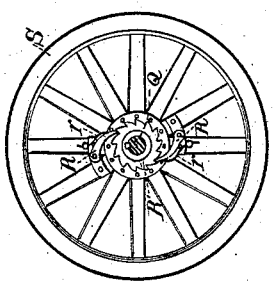

UNITED STATES PATENT OFFICE.

JOHN C. PRESCOTT, OF CINCINNATI, OHIO, ASSIGNOR OF ONE-HALF TO JOHN O. SLOAN, OF SAME PLACE; SAID JOHN O. SLOAN ADMINISTRATOR OF JOHN C. PRESCOTT, DECEASED.

GRADING AND DITCHING MACHINE.

SPECIFICATION forming part of Letters Patent No. 257,758, dated May 9, 1882.

Application filed May 12, 1881. (No model.)

*To all whom it may concern:*

Be it known that I, JOHN C. PRESCOTT, of the city of Cincinnati, in the county of Hamilton and State of Ohio, have invented certain new and useful Improvements in Grading and Ditching Machines, of which the following is a specification.

My invention relates to that class of machines in which the earth is thrown upon an endless conveyer, carried by the conveyer across the machine, and deposited upon the opposite side.

The object of my invention is a simple, durable machine, that will not clog in use, is not liable to get out of order, and that can be operated with much less friction and power than those heretofore in use, while performing greater duty.

The machine, its construction, and mode of operation will be fully understood from the following description of the accompanying drawings, in which—

Figure 1 is a top plan view of the machine. Fig. 2 is a vertical section through line $x\ x$ of Fig. 1, looking to the front of the machine. Fig. 3 is a top plan view of the divided scraper. Fig. 4 is a side view of the same and part of its supporting-frame; and Fig. 5 is a side elevation of one of the back wheels, showing the ratchet and pawl by which the apron is driven.

The frame A, which supports the operating mechanism, is mounted upon four wheels. Upon the frame, in front, is a seat for the driver, and between one of the back wheels and the scraper is a platform, B, upon which an attendant stands to operate the levers by which the scraper is elevated and lowered, the end of the endless carrier adjusted, and its driving mechanism connected and disconnected.

Arranged transversely to the line of draft is an endless carrier, G, which receives the earth thrown upon it by the scraper and conveys it to the opposite side of the machine. The carrier is in two parts. The lower part is supported to turn upon a shaft, C, fixed in the frame of the machine transversely under the carrier-frame. The upper section is similarly mounted upon shafts D, supported by brackets secured to frame A. The outer end of the upper section is supported by guy-rods or chains E, which are attached to it and hooked to the top of two upright posts of frame A. The outer end of the carrier may be elevated, and so held by passing the eye $e$ over the hook on the said posts, thus contracting the width of the machine for driving through gateways and convenience in conveying the machine when not in use. The lower section of the endless-carrier frame is also adjustable around its supporting-shaft. Its lower end is supported by two rods, F, which pass through eyebolts secured in the carrier-frame. The upper ends of the rods F are connected to the ends of crank-levers $f$, which are secured upon a shaft, $f'$, that has its bearings in cross-pieces of frame A. One of these levers $f$ extends up and terminates in a handle, by which the lower end of the carrier is elevated and lowered by the attendant. The handle end of the lever is armed with a pawl, $f^2$, which, engaging with a rack upon one of the cross-bars of the frame, retains the lower end of the conveyer in position.

The scraper H I, which takes up and deposits the earth upon the endless apron, is made in two parts. The part I is secured to the end of the conveyer-frame. Its upper end or edge curves over the lower end of the apron. The leading end has also an upward-curved piece. These protect the end of the carrier and prevent clogging. The part H is hung from the end of a frame, which is mounted to turn upon a shaft, $j$. This frame is composed of an end beam, J, from which the part H of the scraper is suspended by metal bars and two angular side pieces, J J', which extend inwardly, and are bent up to receive the shafts $j$, which are supported in cross-bars of frame A. The part H inclines up toward its rear outer end, like the mold-board of a plow, so that the earth taken up will be turned over the part I and forced as the machine advances upon the endless apron G. The leading vertical ends of each part of the scraper are sharpened to an edge, and the front edges are each inclined back, meeting at an angle. By this arrangement the earth is thrown toward the center of the scoop-shaped scraper and the small roots or sod severed by a drawing cut, making the draft easier and the ditch cut with smooth sides and bottom.

Secured in front of scraper H is a gage-wheel, L, to steady the motion of the scraper-frame. The frame is prevented from dragging back by a chain, $j^2$, which is attached to the front end of beam J and to the front of frame A.

The scraper-frame is elevated and lowered by a compound lever, K K'. The beam J is connected to the forked end of lever K by rods $k$. The forked lever is fulcrumed upon one of the longitudinal beams of frame A by eyebolts and staples at $k$, Fig. 2. The pointed end of this lever is connected to its other part, K', by a link, $k^2$. The lever-arm K' has its fulcrum in a stud-bolt, $k^3$, in an upright post of the frame A. The handle end of this lever extends across the frame in a position to be operated by the attendant. The part H of the scraper is elevated by pressing down lever K', and so held by passing the handle end under a hook, $k^4$. When depressed the part H rests upon and is supported by the part I. Any tendency to elevate the part H by the condition of soil is overcome by the attendant placing his foot upon the beam J.

The endless conveyer G is driven by bevel-gear wheels, one of which is secured upon the shaft of the roller at the upper end of the conveyer-frame and the other upon a shaft, M, which has a universal joint at $m$ to permit the outer end or section of the endless conveyer to be elevated and lowered. The shaft M is driven through a clutch, N, one member of which is splined upon the axle-shaft of the back wheels, while the other is fitted to turn loosely thereon, and is connected to or has keyed upon it a slightly-beveled cog-wheel, O, which meshes into a similarly-beveled pinion secured upon the inner end of the universally-jointed shaft M. The clutch N is thrown into and out of connection by a lever, $n$, which is actuated by a sliding rod, P, through a lever, $p$, which has its fulcrum in a pin secured in one of the lower frame-timbers. The lever $p$ extends up past and is connected to the rod P, terminating in a handle, by which the attendant connects and disconnects the clutch to set the endless apron G in motion or stop it when the machine is being drawn forward to its work.

The axle-shaft Q is driven in one direction by pawls R, pivoted on pins projecting from plates which are secured to the spokes of the driving-wheel S. The pawls, by engaging a ratchet-wheel, R', which is keyed to the shaft Q, (see Fig. 5,) drive the apron when the machine is drawn forward and permit it to remain stationary should any backward motion of the machine take place. The pawls are held in connection with the teeth of their ratchet-wheel by springs $r$.

In operation my machine requires two attendants—the driver, who occupies the front seat, T, and another, who stands upon platform B to operate the levers by which the scraper and lower end of the platform are elevated and lowered and the conveyer-driving mechanism coupled and disconnected. It should be understood that where the soil to be removed is hard, clayey, or stony it should be first plowed; but for loose or sandy soil no previous plowing is required, the machine being drawn along with the line of the excavation or embankment to be made. The clutch N is thrown in gear, the lower end of the conveyer and part I of the scraper depressed the proper distance by lever $f$ and held by pawl $f^2$, the part H of the scraper is let down upon its other part, I. As the machine advances to its work the earth is scooped up by the scraper and deposited upon the endless apron G, (which has cross-strips $g$ riveted upon it to prevent the material from slipping back,) and by it carried across the machine and deposited in a line upon the other side.

Should a stump or other obstacle be in the line of work, either the part H or both parts of the scraper and lower end of the conveyer may be quickly elevated by the attendant to escape it without stopping the machine or changing its path.

Should it be necessary to back the machine the pawls will slip around upon ratchet R without turning shaft Q, thus letting the conveyer G remain stationary.

What I claim, and desire to secure by Letters Patent, is—

1. In a machine of the character described, the combination of the frame A, the two-part endless conveyer-frame, the lower part carrying the part I of the scraper, and means for the independent adjustment of either outer end of the conveyer-frame upon bearings arranged near the hinged joint, substantially as described.

2. The combination, substantially as specified, of frame A, the transversely-arranged endless conveyer G and its frame, and the part I of the scraper secured to the lower end of the conveyer-frame and curving over the lower end and front edge of the apron to protect the same.

3. The two-part scraper H I, each part having vertical and lower horizontal edges, the lower edges being cut back toward the center, in combination with the endless conveyer of a grading and ditching machine, as shown and described.

4. In a machine of the character described, the combination of the endless carrier G and its adjustable frame, the scraper composed of two parts, H I, the scraper-frame J J', with levers K K' to independently elevate the part H, substantially as described.

5. The combination, substantially as specified, of the adjustable endless conveyer, the part I of the scraper secured thereto, the rods F, their actuating-levers and retaining-pawl with the frame J J', part H, and compound lever K K', for the purpose described.

6. The combination, substantially as hereinbefore set forth, of frame A to support the operative parts, the adjustable apron and scraper-frames, and clutch N, with platform B, and the levers for elevating and lowering the frames, and for operating the clutch in proximity to said platform, for the purpose set forth.

JOHN C. PRESCOTT.

Witnesses:
GEO. J. MURRAY,
JOHN O. SLOAN.